United States Patent
Wheeler

(10) Patent No.: US 10,572,514 B2
(45) Date of Patent: *Feb. 25, 2020

(54) HIGH DEFINITION MAP AND ROUTE STORAGE MANAGEMENT SYSTEM FOR AUTONOMOUS VEHICLES

(71) Applicant: DeepMap Inc., Palo Alto, CA (US)

(72) Inventor: Mark Damon Wheeler, Saratoga, CA (US)

(73) Assignee: DeepMap Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,270

(22) Filed: May 9, 2019

(65) Prior Publication Data
US 2019/0266179 A1    Aug. 29, 2019

Related U.S. Application Data

(63) Continuation of application No. 15/857,558, filed on Dec. 28, 2017, now Pat. No. 10,353,931.
(Continued)

(51) Int. Cl.
*G06F 17/30* (2006.01)
*G06F 12/0811* (2016.01)
(Continued)

(52) U.S. Cl.
CPC ............ *G06F 16/29* (2019.01); *G01C 21/00* (2013.01); *G05D 1/0088* (2013.01);
(Continued)

(58) Field of Classification Search
None
See application file for complete search history.

(56) References Cited

U.S. PATENT DOCUMENTS 8,280,414 B1    10/2012 Nourse et al.
2005/0270311 A1    12/2005 Rasmussen et al.
(Continued)

FOREIGN PATENT DOCUMENTS

| DE | 102017203151 A1 | 9/2017 |
| EP | 2120014 B1 | 11/2009 |
| JP | 2012168169 A | 9/2012 |

OTHER PUBLICATIONS

PCT International Search Report and Written Opinion, PCT International Application No. PCT/US17/68834, dated Mar. 6, 2018, 15 pages.
(Continued)

*Primary Examiner* — Thomas G Black
*Assistant Examiner* — Demetra R Smith-Stewart
(74) *Attorney, Agent, or Firm* — Fenwick & West LLP

(57) ABSTRACT

High definition maps for autonomous vehicles are very high resolution and detailed, and hence require storage of a great deal of data. A vehicle computing system provides multi-layered caching makes this data usable in a system that requires very low latency on every operation. The system determines which routes are most likely to be driven in the near future by the car, and ensures that the route is cached on the vehicle before beginning the route. The system provides efficient formats for moving map data from server to car and for managing the on-car disk. The system further provides real-time accessibility of nearby map data as the car moves, while providing data access at optimal speeds.

25 Claims, 14 Drawing Sheets

Related U.S. Application Data

(60) Provisional application No. 62/441,072, filed on Dec. 30, 2016.

(51) Int. Cl.

| | | |
|---|---|---|
| *G06F 9/54* | (2006.01) | |
| *G06D 1/02* | (2006.01) | |
| *G06F 16/29* | (2019.01) | |
| *G06F 12/0875* | (2016.01) | |
| *G01C 21/00* | (2006.01) | |
| *G05D 1/02* | (2020.01) | |
| *G05D 1/00* | (2006.01) | |

(52) U.S. Cl.
CPC ......... *G05D 1/0212* (2013.01); *G05D 1/0274* (2013.01); *G06F 9/54* (2013.01); *G06F 12/0811* (2013.01); *G06F 12/0875* (2013.01); *G05D 2201/0213* (2013.01); *G06F 2212/1016* (2013.01); *G06F 2212/1024* (2013.01); *G06F 2212/283* (2013.01)

(56) References Cited

U.S. PATENT DOCUMENTS

| | | |
|---|---|---|
| 2012/0143430 A1 | 6/2012 | Broggi et al. |
| 2013/0321401 A1 | 12/2013 | Piemonte et al. |
| 2014/0141803 A1 | 5/2014 | Marti et al. |
| 2015/0300823 A1 | 10/2015 | Kahn et al. |
| 2017/0123421 A1 | 5/2017 | Kentley et al. |

OTHER PUBLICATIONS

United States Office Action, U.S. Appl. No. 15/857,558, dated Nov. 2, 2018, 12 pages.

1200

```
Send information describing a route to be travelled by the autonomous vehicle
1210
                            ↓
Receive a plurality of compressed map tiles from the online HD map system
1220
                            ↓
Decompress the plurality of compressed map tiles
into a plurality of accessible map tiles
1230
                            ↓
Determine localization data describing a position of the autonomous vehicle
along a first portion of the route
1240
                            ↓
Identify a first accessible map tile based in part on the localization data
1250
                            ↓
Load the first accessible map tile in a RAM, for utilization in driving the
autonomous vehicle
1260
                            ↓
Determine a first subset of accessible map tiles based in part on the localization
data, each accessible map tile corresponding to a second portion of the route
1270
                            ↓
Load the first subset of accessible map tiles in the RAM
1280
                            ↓
Access the first accessible map tile from the RAM for use in driving the
autonomous vehicle
1290
```

FIG. 12

HIGH DEFINITION MAP AND ROUTE STORAGE MANAGEMENT SYSTEM FOR AUTONOMOUS VEHICLES

CROSS REFERENCE TO RELATED APPLICATIONS

This application is a continuation application of co-pending U.S. application Ser. No. 15/857,558 filed on Dec. 28, 2017, which claims benefit of priority to U.S. Provisional Application No. 62/441,072, filed on Dec. 30, 2016, both of which are incorporated by reference.

BACKGROUND

This disclosure relates generally to maps for autonomous vehicles, and more particularly to providing high definition maps with high precision and up-to-date map data to autonomous vehicles for safe navigation.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles. Additionally there is a tradeoff in higher resolution maps in that they are larger in terms of size of data, making storage of these high resolution maps in autonomous vehicles challenging. With constant updating and modifying of the high resolution maps, transmitting an entire high resolution map to each autonomous vehicle is costly in computing resources and time required for transmission.

SUMMARY

Embodiments of the invention generate and maintain high definition (HD) maps that are detailed, very high resolution (e.g. 5 cm resolution), and provide the most updated road conditions for safe navigation. This requires a lot of data, such as multiple Petabytes to cover one country. Embodiments of the invention describe efficient methods of transferring HD maps between an online system and an autonomous vehicle computing system, and the data can be made usable in a system that requires very low latency on every operation. For example, the caching system gives the appearance of immediate and efficient access of a large (e.g., multi-Petabyte) database to a processor controlling a vehicle with only a much smaller amount of storage (e.g., a few hundred Gigabyte disk and several Gigabytes of random-access memory (RAM)). The system provides (1) efficient (in time, space, bandwidth etc.) formats for moving map data between an online system (e.g., on the cloud) to a vehicle, (2) efficient management of the on-vehicle disk, (3) real-time accessibility of the relevant (nearby) map data as the vehicle moves through its environment, and (4) access to all data as if it were already in RAM and accessible at optimal speed.

In some embodiments, the system provides this efficient method of transferring HD maps by partitioning the maps into map tiles that are then compressed prior to being transferred. The method generally comprises receiving these compressed map tiles corresponding to a route of an autonomous vehicle from the online system, and decompressing map tiles. The autonomous vehicle can further determine its geographical location for determining which decompressed map tiles to upload into its RAM in preparation for use by a route manager by the autonomous vehicle.

BRIEF DESCRIPTION OF THE DRAWINGS

FIG. 12 illustrates a flowchart of the method of efficiently transferring map tiles of the HD map, according to an embodiment.

Figure 1:
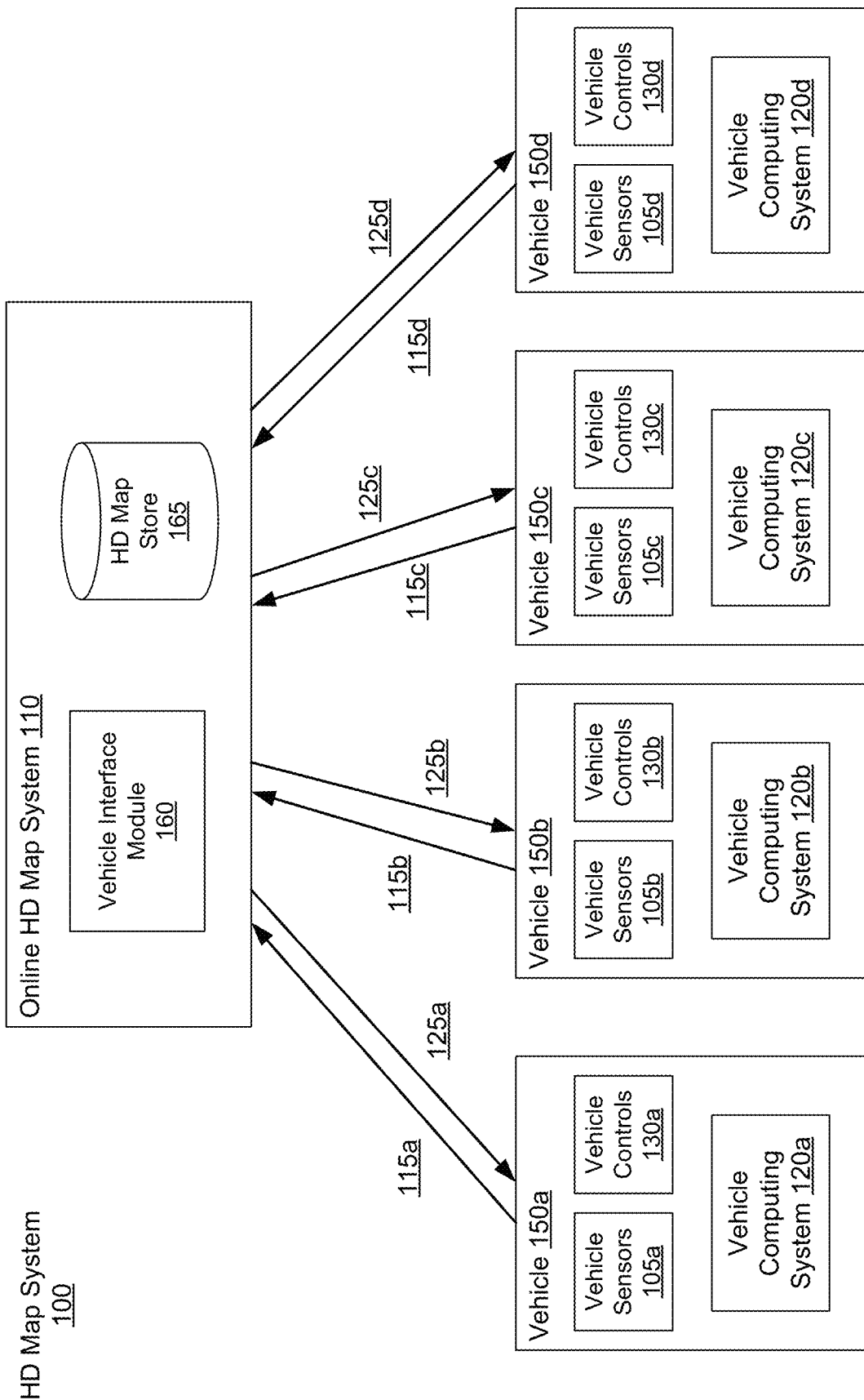
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane. HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Since it is not possible to download an entire map onto a car, the system manages what is kept on the car in cache. The system provides route management to determine which routes are most likely to be driven in the near future by the car. When a route is selected to be driven, the system ensures that the data for that route is cached on the car before the car begins driving the route. Once the data is downloaded onto the car, the system makes sure the car processing system can use the data efficiently. To use the data, it typically needs to be loaded into memory. To use the data efficiently (low latency), it typically needs to be accessible using some optimized data structure (e.g., an indexed data structure like a map or a tree). The index may be designed around the primary access patterns including: (1) lookup by ID: a hash map or (2) lookup by spatial location: a tree, such as KD-tree or R-tree or spatial hash map. The system could send down indexed data from the cloud but this would add a lot of data to an already slow/costly network connection. Instead, the system can optimize the network bandwidth usage by sending a very highly compressed form of the map data that contains only the bare necessities for the current routing the car will perform (e.g., no indexes). This provides a relatively small payload from the cloud and a small disk footprint when stored on the car's disk. The different levels of caching in this multi-layered caching system are described in more detail below.

Embodiments of the invention allow safe navigation for an autonomous vehicle by providing high latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
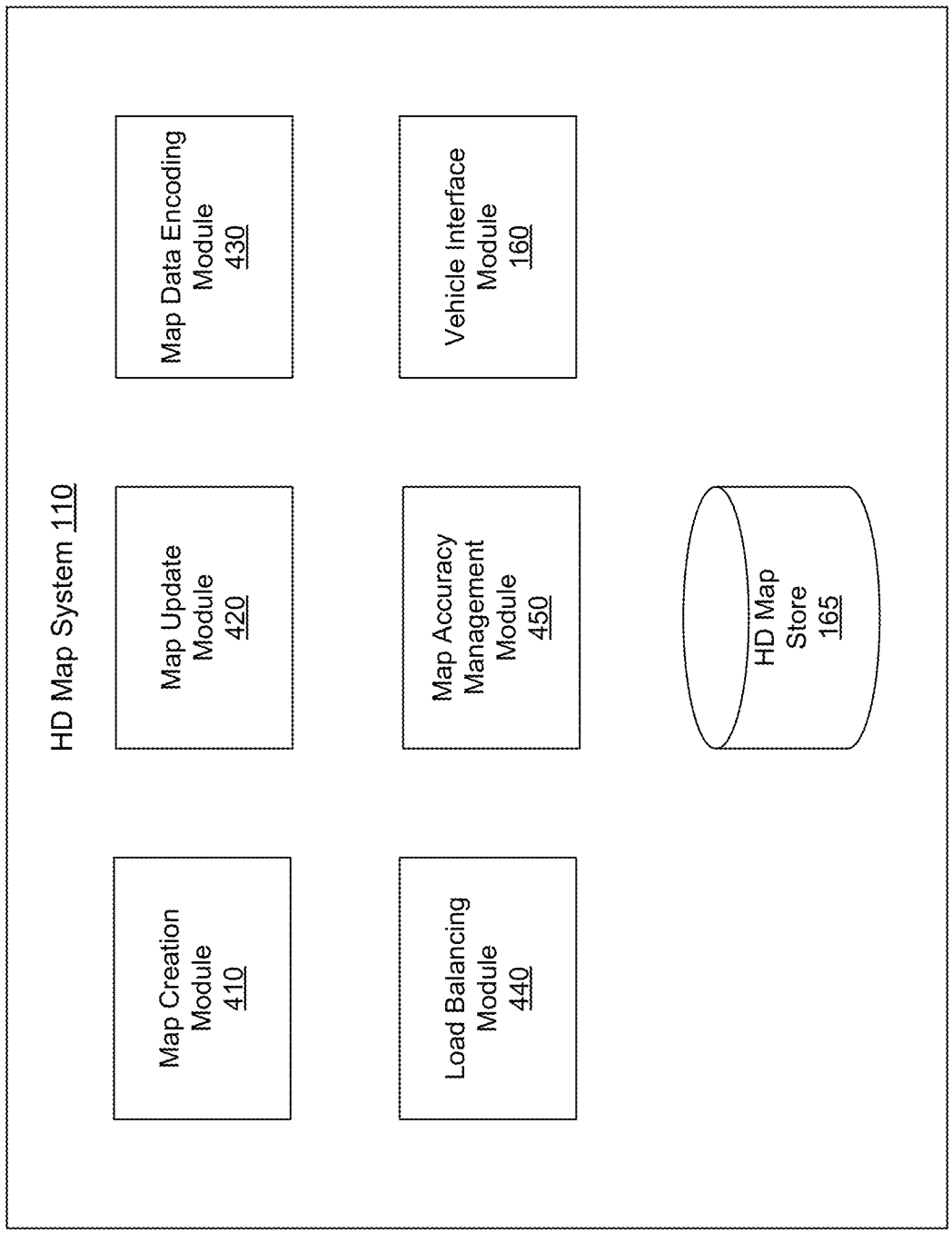
FIG. 4 shows the system architecture of an online HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route. As will be further described, methods of efficiently utilizing the HD maps by the autonomous vehicles implement varying formats of sections of the HD maps.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. In some embodiments, the vehicle computing system 120 converts map data received from the online HD map system 110 into various formats for ease of use in navigating the vehicle 150. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
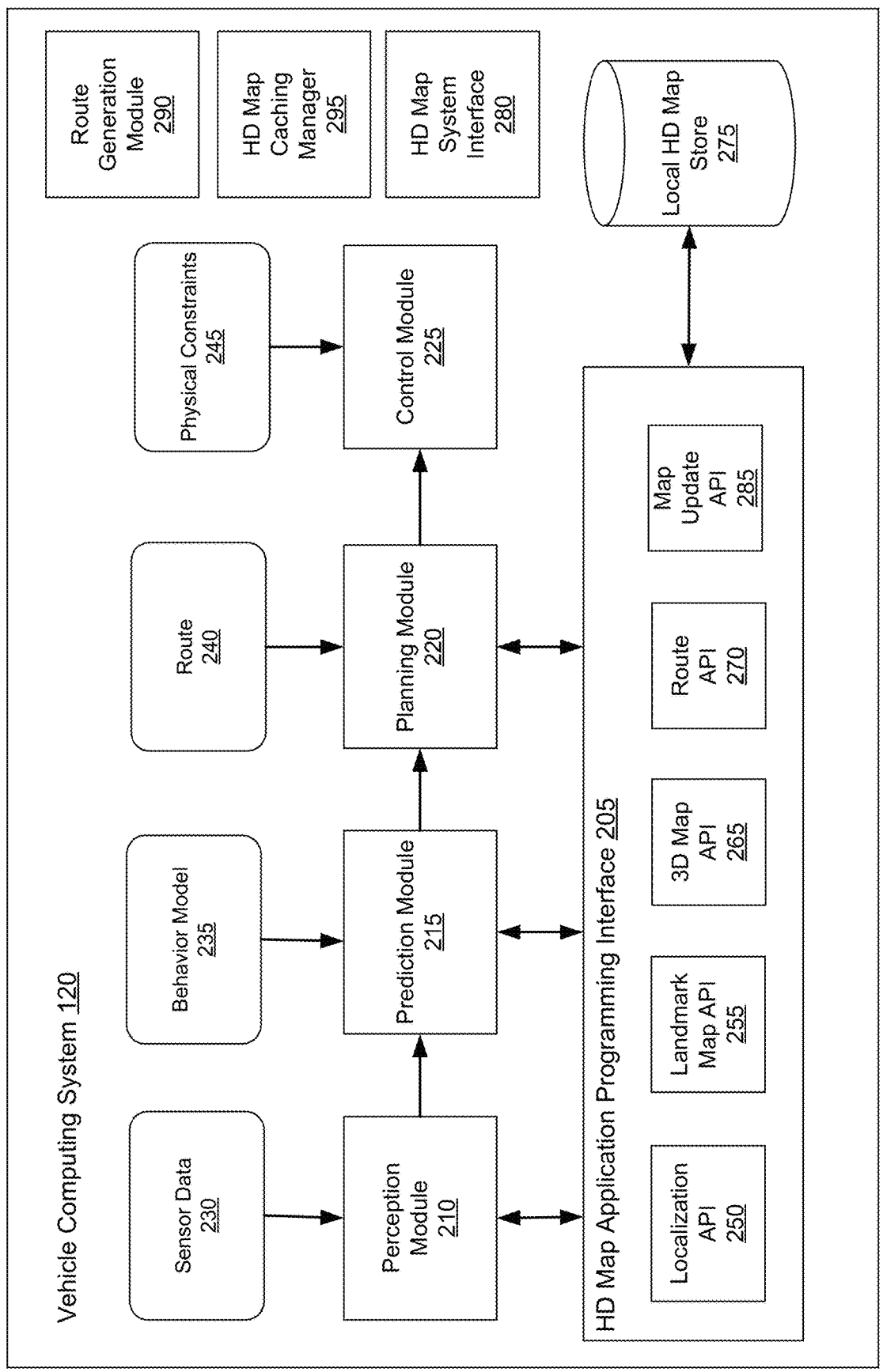
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a route generation module 290, a HD map caching manager 295, and an HD map application programming interface (API) 205. The various modules of the vehicle computing system 120 process various type of data including sensor data 230, a behavior model 235, routes 240, HD map data, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next. Predictions by the prediction module 215 can influence routes by the vehicle 150 and correspondingly which maps to access for safe navigation.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on. Additionally, the planning module 200 may prompt processing or accessing of various sections of the HD map in preparation vehicle actions.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly. In some instances, the control module 225 determines the control signals based on accessing the HD map.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The route generation module 290 computes and determines the optimal route traversing from a source address (or source location) to a destination address (or destination location). The route generation module 290 stores a set of partial routes and grows them to obtain a final route. In some embodiments, the route generation module 290 may dynamically adjust the route as the vehicle 120 drives along the route. Accordingly, the route generation module 290 may query another module for updating or preparing map data for use by the control module 225. In some instances, the route generation module 290 queries the HD map caching manager 295 for updating or preparing map data for use. Some functionality of the route generation module 260 may be performed in the online HD map system 110. Accordingly, the online HD map system 110 may store a corresponding route generation module 260 that interacts with the route generation module 260 stored in the vehicle computing system 120.

The HD map caching manager 295 processes the HD map data as received from the online HD map system 110. After processing the HD map data, the HD map caching manager 295 stores the HD map data in the local HD map store 275. Processing the HD map data by the HD map caching manager 295 may involve a variety of processes so as to provide the HD map data for use by the various modules of the vehicle computing system 120 with optimal efficiency. Processing the HD map data may include, but not limited to, decompressing compressed formats of the HD map data, indexing the HD map data, partitioning the HD map data into subsections, loading the HD map data, and storing the HD map data. Additionally, the HD map caching manager 295 may comprise a variety of modules for accomplishing the processing of the HD map data and/or a variety of stores for storing the HD map data in its initial format, its intermediary formats in processing of the HD map data, and/or its terminal format for use by the other modules. These processes will be further described in detail in conjunction with FIG. 9-12.

The various modules of the vehicle computing system 120 including the perception module 210, prediction module 215, and planning module 220 receive map information to perform their respective computation. The HD map caching manager 295 manages and stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD map caching manager 295. The HD map API 205 is capable of processing the HD map data format for use by the various modules of the vehicle computing system 120. The HD map API 205 provides the vehicle computing system 120 with an interface for interacting with the HD map data. The HD map API 205 includes several APIs including the localization API 250, the landmark map API 255, the route API 265, the 3D map API 270, the map update API 285, and so on. In other embodiments, the HD map caching manager 295 stores the HD map data in various stores with the HD map caching manager 295, as will be described in conjunction with FIG. 9-12. In these embodiments, the HD map caching manager 295 interacts the HD map API 205 for providing an interface for utilizing the HD map data.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localization API 250 to determine location of the vehicle periodically based on the LIDAR using scanner data, for example, at a frequency of 10 Hz. The vehicle computing system 120 may invoke the localization API 250 to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization API 250 includes a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map API 265 can manage accessing of the 3D maps from the local HD map store 275 for use by the vehicle computing system 120. The 3D map API 265 retrieves portions of 3D maps from the local HD map store 275; in some embodiments, portions of the 3D map is in a compressed format. In these embodiments, the 3D map API 265 decompresses portions of the 3D map relevant to a current route. The decompressed portions of the 3D map are then selectively loaded onto a random-access memory (RAM) for accessible use by other components of the vehicle computing system 120 through the HD map API 205. Detailed description of methods of managing access of the 3D maps will be discussed in conjunction with FIG. 9.

The 3D map API 265 also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes. In some instances, the download-map-updates API is prompted by the HD map caching manager 295 when HD map data needs to be updated.

The route API 270 returns route information including full route between a source and destination and portions of route as the vehicle travels along the route. The 3D map API 365 allows querying the HD Map. The route API 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different computer platforms with autonomous driving capabilities, for example, collection and analysis of vehicle sensor data. Examples of computer platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several computer platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
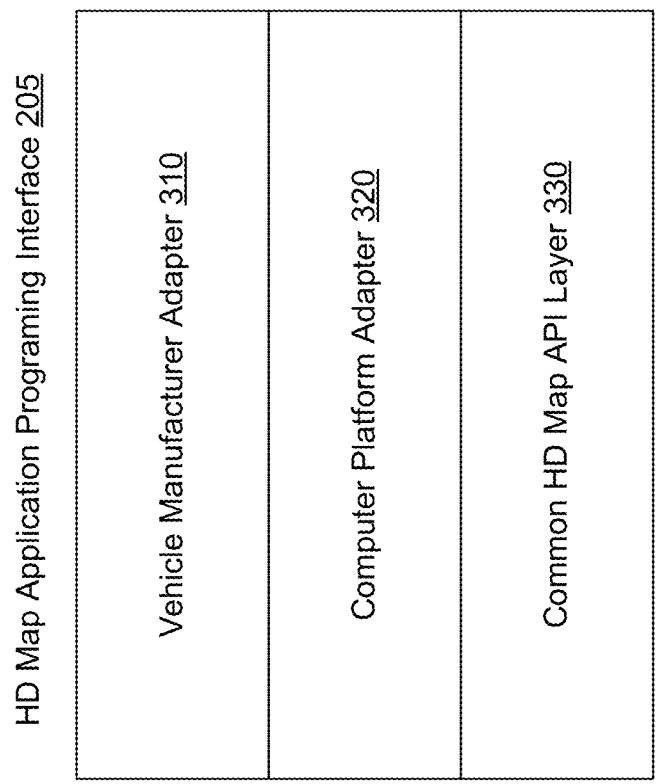
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a computer platform adapter 320, and a common HD map API layer 330. The common HD map API layer comprises generic instructions that can be used across a plurality of vehicle computer platforms and vehicle manufacturers. The computer platform adapter 320 include instructions that are specific to each computer platform. For example, the common HD Map API layer 330 may invoke the computer platform adapter 320 to receive data from sensors supported by a specific computer platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores computer platform adapters 320 for a plurality of computer platforms and vehicle manufacturer adapters 310 for a plurality of vehicle manufacturers. The online HD map system 110 determines the particular vehicle manufacturer and the particular computer platform for a specific autonomous vehicle. The online HD map system 110 selects the vehicle manufacturer adapter 310 for the particular vehicle manufacturer and the computer platform adapter 320 the particular computer platform of that specific vehicle. The online HD map system 110 sends instructions of the selected vehicle manufacturer adapter 310 and the selected computer platform adapter 320 to the vehicle computing system 120 of that specific autonomous vehicle. The vehicle computing system 120 of that specific autonomous vehicle installs the received vehicle manufacturer adapter 310 and the computer platform adapter 320. The vehicle computing system 120 periodically checks if the online HD map system 110 has an update to the installed vehicle manufacturer adapter 310 and the computer platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the map data efficiently as well as send the required map data to vehicles 150 efficiently. To accomplish this, the map data encoding module 430 can compress the map data prior to sending over the required map data to vehicles 150. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
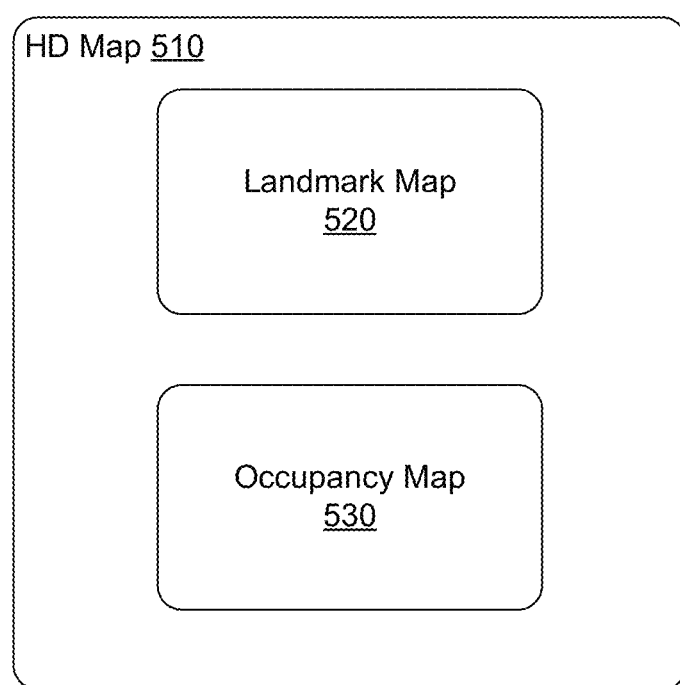
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
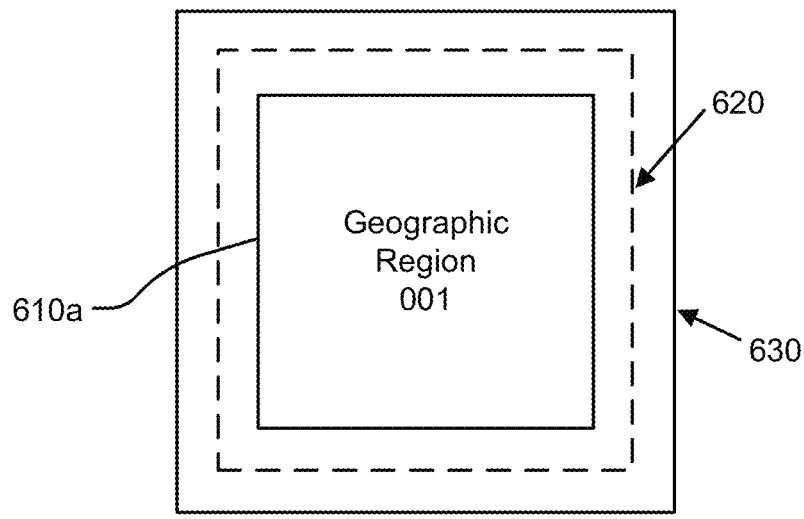
FIGS. 6A-B illustrate geographical regions defined in an HD map, according to an embodiment.
Figure 6B:
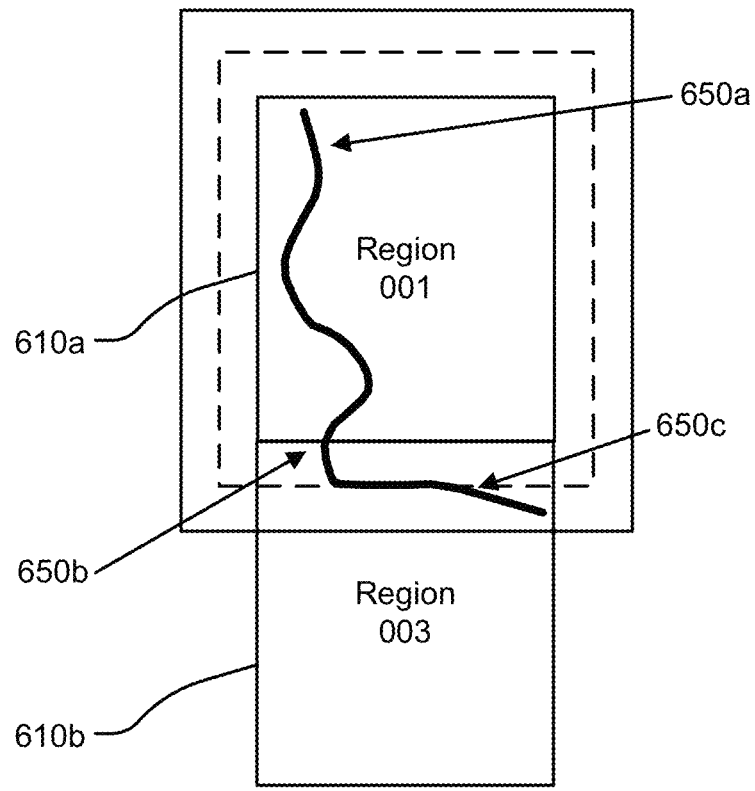

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
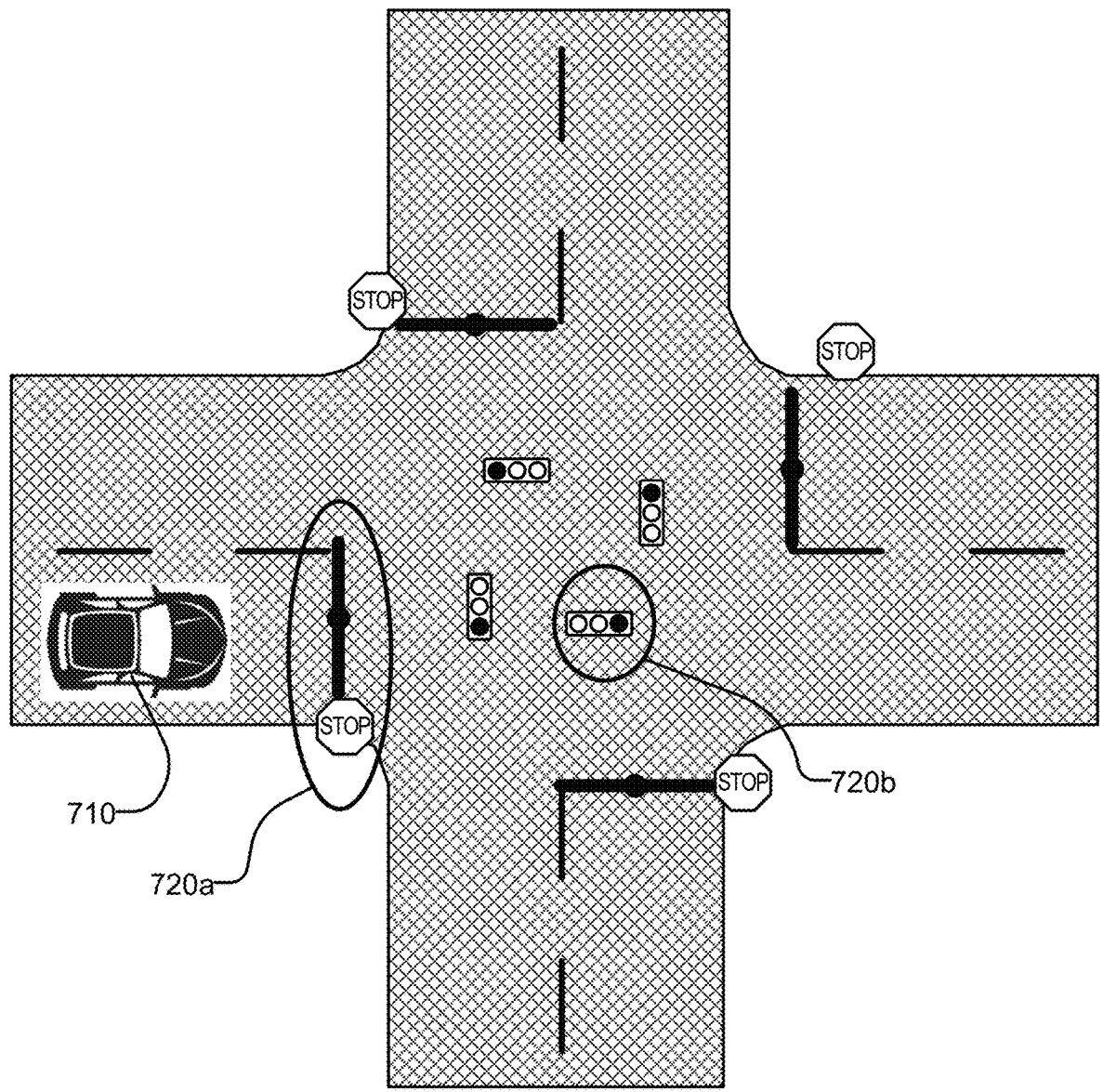
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
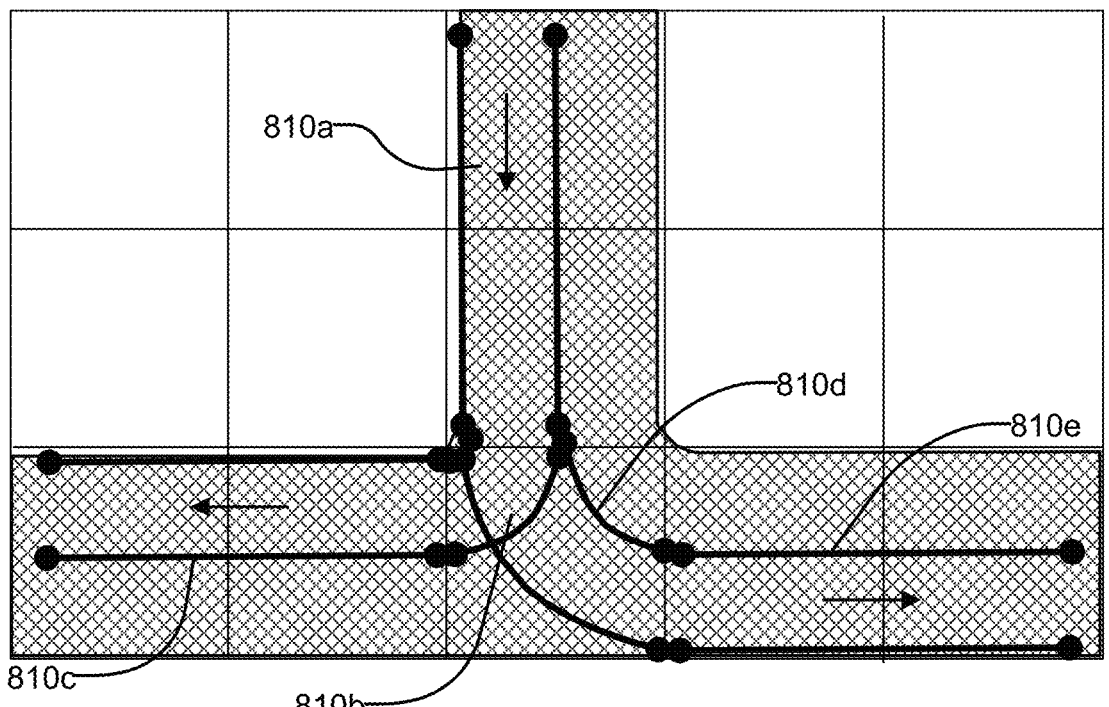
FIGS. 8A-B illustrates lane elements and relations between lane elements in an HD map, according to an embodiment.
Figure 8B:
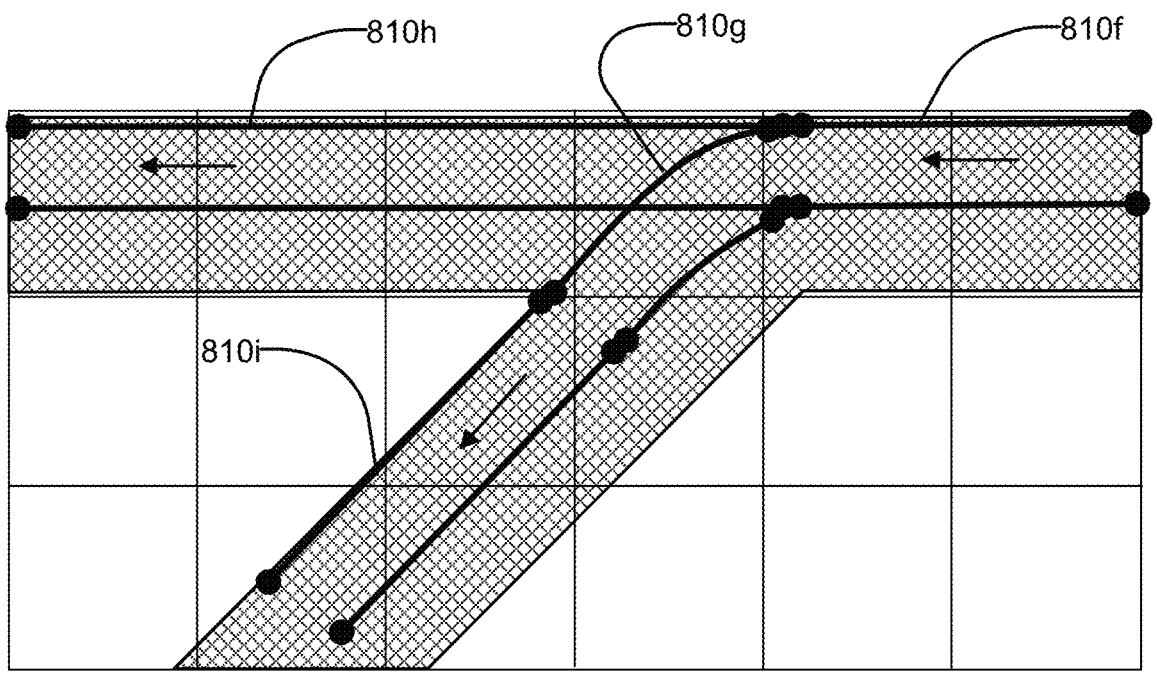

FIGS. 8A-B illustrates lane elements and relations between lane elements in an HD map, according to an embodiment. FIG. 8A shows an example of a T junction in a road illustrating a lane element 810*a* that is connected to lane element 810*c* via a turn lane 810*b* and is connected to lane 810*e* via a turn lane 810*d*. FIG. 8B shows an example of a Y junction in a road showing label 810*f* connected to lane 810*h* directly and connected to lane 810*i* via lane 810*g*. The HD map system 100 determines a route from a source location to a destination location as a sequence of connected lane elements that can be traversed to reach from the source location to the destination location.

HD Map Cache Management

Figure 9:
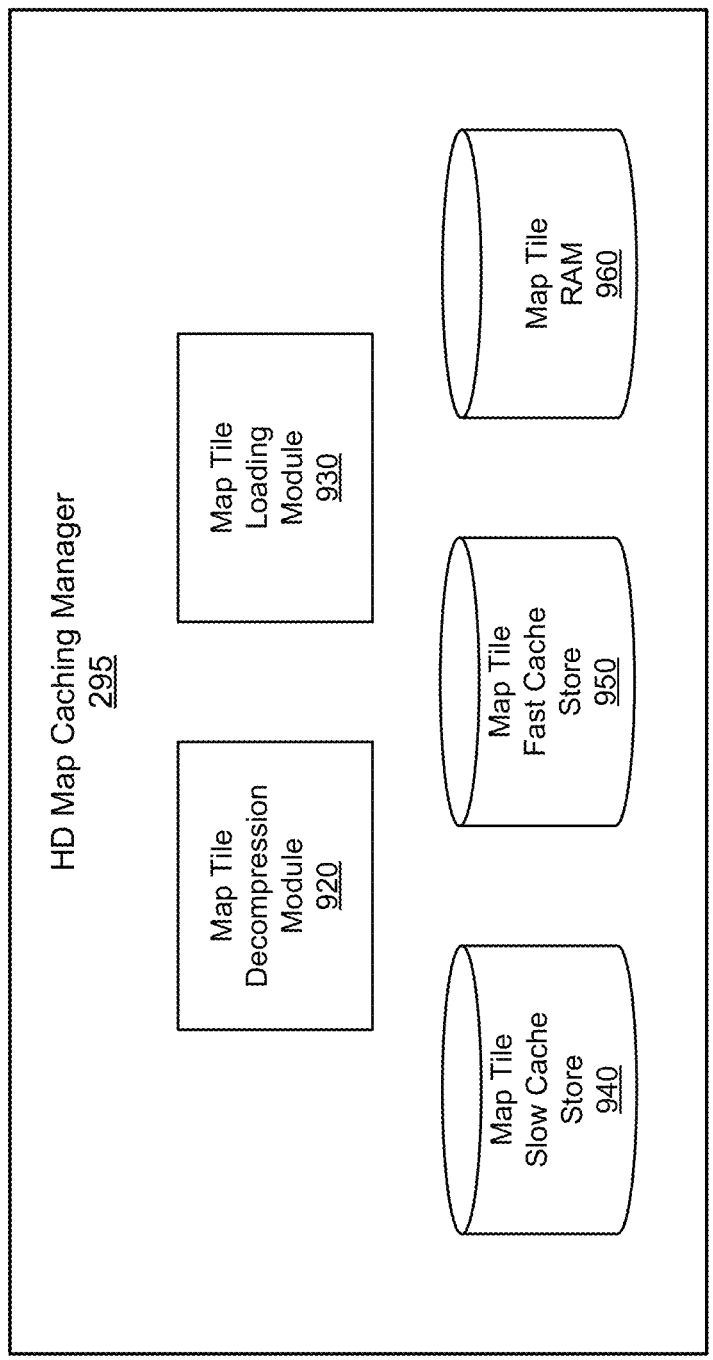
FIG. 9 shows the system architecture of the HD map caching manager, according to an embodiment.

FIG. 9 shows the system architecture of the HD map caching manager 295, according to an embodiment. The HD map caching manager 295 processes the HD map data and stores the HD map data for use by various modules of the vehicle computing system 120, according to one or more embodiments. The HD map data comprises discretized portions of the HD map called map tiles. Processing the HD map data by the HD map caching manager 295 may involve a variety of processes which may include, but not limited to, decompressing compressed formats of the HD map data, indexing the HD map data, partitioning the HD map data into subsections, loading the HD map data, and storing the HD map data. Additionally, the HD map caching manager 295 may comprise a variety of modules for accomplishing the processing of the HD map data and/or a variety of stores for storing the HD map data in its initial format, its intermediary formats in processing of the HD map data, and/or its terminal format for use by the other modules. In one or more embodiments, the HD map caching manager 295 includes a map tile decompression module 920 and a map tile loading module 930 for processing the HD map data. The HD map caching manager 295 also includes a map tile slow cache store 940, a map tile fast cache store 950, and a map tile RAM 960. In some embodiments, the map tile slow cache store 940 could serve similar functionality as the local HD map store 275 of FIG. 2. In other embodiments, the map tile RAM 960 could be incorporated in another RAM on the vehicle computing system 120.

The map tile decompression module 920 decompresses the compressed HD map data received by the online HD map system 110. The map tile decompression module 920 performs a series of algorithms to the compressed HD map data for restoring the resolution of the HD map data. With varying compression algorithms, the map tile decompression module 920 may vary in its decompression algorithms. Some examples of compression models utilize probability in creating probabilistic models for determining statistical patterns within the HD map data. The statistical patterns are reduced to statistical redundancies which represent the full sized HD map data. In these examples, the map tile decomposition module 920 receives the statistical redundancies as the compressed HD map data and reconstructs the full sized HD map data with algorithms applied to the statistical redundancies. After the map tile decompression module 920 decompresses the compressed HD map data into decompressed HD map data, the map tile decompression module 920 stores the decompressed HD map data as accessible map tiles. In additional embodiments, the map tile decompression module 920 indexes the decompressed HD map data. As the HD map data is partitioned into map tiles, the map tile decompression module 920 may augment the accessible map tiles with coordinates of a grid. The coordinates of the grid help in relating accessible map tiles to one another in context of the grid. In a simple representative sample, the accessible map tiles have square dimensions; the map tile decompression module 920 augments each accessible map tile with a pair of coordinates (i.e., (2, 3) or (3, 12)). In line with the indexing of the accessible map tiles, the map tile decompression module 920 may further augment each accessible map tile with other metadata. Different types of metadata may include categories of map tiles, unique identifiers for each map tile, timestamps of receipt of each map tile, location data such as GPS coordinates, etc.

The map tile loading module 930 loads the accessible map tiles into the map tile RAM 960. As the accessible map tiles are in a decompressed format, the accessible map tiles are larger sized files compared to the map tiles in the compressed format. The map tile loading module 930 retrieves select accessible map tiles for loading in the map tile RAM 960. The map tile loading module 930 determines which accessible map tiles to retrieve for loading in the map tile RAM 960. The map tile loading module 930 receives localization data specifying a position of the vehicle 150 in the HD map. The map tile loading module 930 identifies the current accessible map tile in which the position of the vehicle 150 is located. The map tile loading module 930 loads the current accessible map tile in the map tile RAM 960. The map tile loading module 930 can determine subsequent subsets of accessible map tiles in preparation for loading in the map tile RAM 960. Further discussion of one or more methods for determining such subsets of accessible map tiles will be discussed in conjunction with FIG. 12.

The stores for storing the varying formats of the HD map data by the HD map caching manager 295 include the map tile slow cache store 940, the map tile fast cache store 950, and the map tile RAM 960. The varying stores streamline efficient decompression and loading of the map tiles stored by the vehicle computing system 120. In one or more embodiments, the map tile slow cache store 940 is integrated as or as part of the local HD map store 275. The map tile slow cache store 940 stores a compressed format of map tiles. Storing compressed map tiles in the map tile slow cache store 940 is relatively inexpensive in terms of computing resources. The map tile fast cache store 950 stores decompressed map tiles with any additional features added by the decompression module 920 as accessible map tiles. Storing decompressed map tiles is costly in regards to computing resources as decompressed map tiles maintain the full resolution of the HD map as generated by the online HD map system 110. Additional features such as indices or tags associated with the decompressed map tiles increase the amount of data each accessible map tile contains. The map tile RAM 960 stores accessible map tiles currently in use by the vehicle computing system 120. The HD map caching manager 960 provides the accessible map tiles within the map tile RAM 960 for interaction with the other modules of the vehicle computing system 120 in navigating the vehicle 150.

Figure 10:
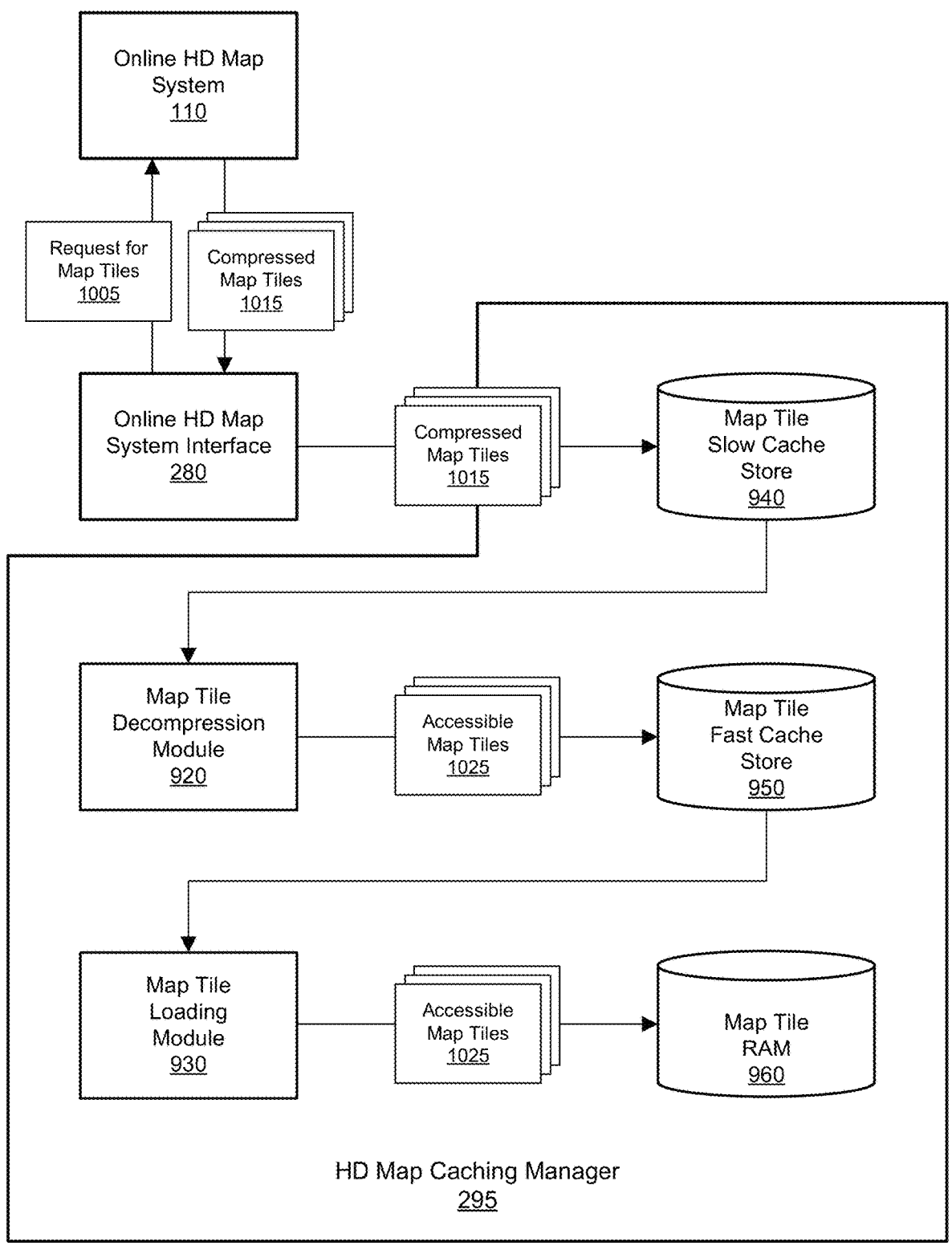
FIG. 10 illustrates a method of efficiently utilizing compressed map tiles of the HD map from the online HD map system by a vehicle computing system, according to an embodiment.

FIG. 10 illustrates a method of efficiently utilizing compressed map tiles 1015 of the HD map from the online HD map system 110 by a vehicle computing system 120, according to an embodiment.

Upon determining a route, the vehicle computing system 120 may provide the HD map caching manager 295 with the determined route. The HD map caching manager assesses whether all map tiles corresponding to the determined route are present in the map tile slow cache store 940 and up to date. If there is a need for additional map tiles or updated map tiles, the HD map caching manager 295 prepares a request for map tiles 1005 to be sent to the online HD map system 110 for the needed map tiles. The request for map tiles 1005 is passed through the online HD map system interface 280 to the online HD map system 110. The online HD map system 110 responds to the request 1005 with one or more compressed map tiles 1015. The online HD map system interface 280 directs the compressed map tiles 1015 to the HD map caching manager 295.

The HD map caching manager 295 receives the compressed map tiles 1015 and prepares them for use by the various modules of the vehicle computing system 120. The HD map caching manager 295 first stores the compressed map tiles 1015 in the map tile slow cache store 940. As the map tile slow cache store 940 stores map tiles in the compressed format, the map tile slow cache store 940 may store compressed map tiles for a plurality of routes or for an entire region of the HD map. In some cases, the HD map caching manager 295 evaluates previously used compressed map tiles stored in the map tile slow cache 940 for removal from the map tile slow cache 940. In any case, the HD map caching manager stores compressed map tiles in the map tile slow cache store 940 as compressed map tiles are relatively inexpensive in terms of computing resources. According to the determined route, the HD map caching manager 295 prompts the map tile decompression module 920 to decompress the map tiles corresponding to the determined route. The map tile decompression module 920 decompresses the map tiles and adds additional features or tags such as indices. The map tile decompression module 920 stores the decompressed map tiles as accessible map tiles 1025 in the map tile fast cache store 950. In one embodiment, the map tile fast cache store 950, at any given time, stores accessible map tiles corresponding to a single route. Storing decompressed map tiles with any additional features utilizes more computing resources than storing compressed map tiles, thus the map tile fast cache store 950 is relatively more expensive in terms of computing resources compared to the map tile slow cache store 940. The map tile loading module 930 receives location data of the vehicle 150 and determines a set of coordinates corresponding to the location of the vehicle 150 within the HD map. The map tile loading module 930 retrieves the accessible map tile corresponding to the set of coordinates and loads the accessible map tile in the map tile RAM 960. The map tile loading 930 then retrieves subsequent accessible map tiles 1025 to load in the map tile RAM 960, with the subsequent accessible map tiles 1025 selected as potential near-future locations of the vehicle 150 in the HD map.

As the vehicle 150 drives along the determined route, the route generation module 290 dynamically updates the route. As the route is dynamically updated, the map tile loading module 930 insures that the current accessible map tile is loaded in the map tile RAM 960. If not, the map tile loading module 930 loads the current accessible map tile in the map tile RAM 960 and then loads subsequent map tiles 1025 in the map tile RAM 960 according to the dynamically updated route, wherein each subsequent map tiles 1025 corresponds to a dynamically updated partial route. For example, the route generation module 290 determines likely near-future positions of the vehicle after an amount of time (e.g., 2 seconds) of driving along the current route and loads in the map tile RAM 960 the accessible map tiles corresponding to the likely near-future positions. The amount of time or time window can be balanced against the available RAM in the system, where more RAM can have a larger window of time. In one embodiment, the map tile RAM 960, at any given time, has accessible map tiles currently in use by modules of the vehicle computing system 120 for navigating the vehicle 150 or to be used for navigating the vehicle 150 in the near-future.

As computing memory in the map tile RAM 960 is more limited than computing memory in the map tile fast cache 940 and in the map tile slow cache 950, the HD map caching manager 295 can efficiently minimize accessible map tiles stored in the map tile RAM 960 at a given time. The HD map caching manager 295 likewise only decompresses map tiles from the map tile slow cache 940 for determined routes, thereby minimizing decompressed map tiles needing to be stored by the map tile fast cache 940. This method of efficiently utilizing compressed map tiles 1015 of the HD map from the online HD map system 110 by a vehicle computing system 120 minimizes needless use of computing resources. The caching manager 295 manages disk space used (e.g., by deciding which compressed tiles are downloaded and which tiles are decompressed on disk) and RAM used (e.g., by deciding which tiles are loaded and when).

Figure 11:
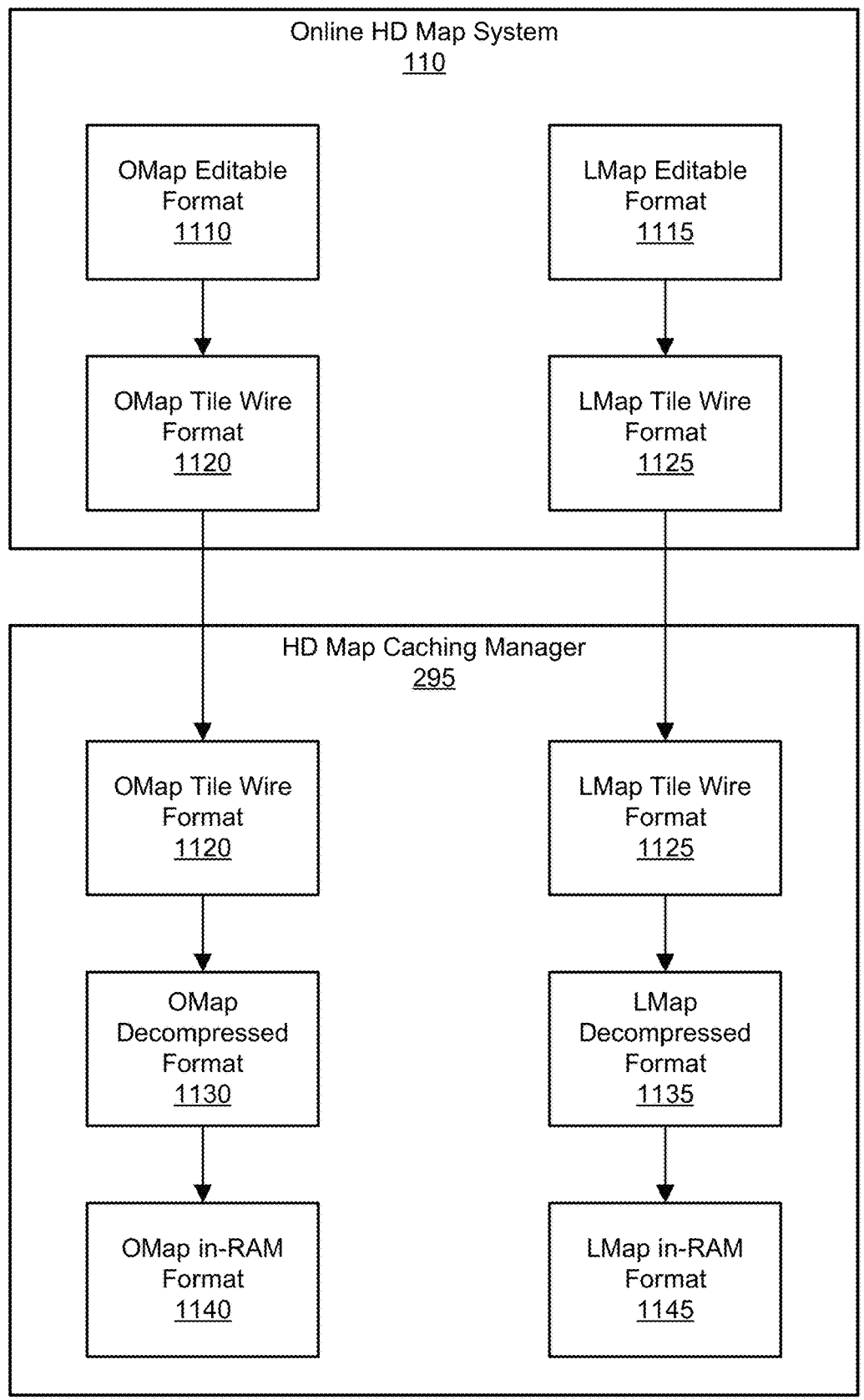
FIG. 11 illustrates an example of the method of efficiently transferring map tiles of the HD map, according to an embodiment.

FIG. 11 illustrates an example of the method of efficiently utilizing compressed map tiles of the HD map from the online HD map system 110 by a vehicle computing system 120, according to an embodiment. In this example, the online HD map system 110 contains two components of the HD map. The HD map contains an Occupancy Map 530 (OMap) and a Landmark Map 520 (LMap), respectively. The online HD map system 110 stores the OMap 530 in an editable format 1110 and similarly the LMap 520 in an editable format 1115 at the online HD map system 110. The online HD map system 110 utilizes the editable formats for generating and/or updating the OMap 530 and the LMap 520. When the updated OMap 530 and the updated LMap 520 are ready for transference to the vehicle computing system, the online HD map system 110 compresses the OMap 530 into a tile wire format 1120 and similarly compresses the LMap 520 into a tile wire format 1125. The tile wire formats are then transferred to the vehicle computing system 120, specifically the HD map caching manager 295 which receives the tile wire formats. The HD map caching manager 295 decompresses the tile wire formats into the OMap decompressed format 1130 and the LMap decompressed format 1135. When the HD map caching manager 295 loads the OMap decompressed format 1130 and the LMap decompressed format 1135 in the map tile RAM 960, the map tile RAM 960 contains the OMap in-RAM format 1140 and the LMap in-RAM format 1145 for access by other modules of the vehicle computing system 120.

As explained above since it is not possible to download the entire map onto the car, the system provides route management to determine which routes are most likely to be driven in the near future by the car. When a route is selected to be driven, the system ensures that the data for that route is cached on the car before the car begins driving the route. Once the data is download onto the car, the system makes sure the vehicle can use it efficiently, which means it is loaded into memory. To use the data efficiently (low latency), it needs to be accessible using some optimized data structure, typically an indexed data structure like a map or a tree. Instead of sending indexed data from the online system, the system optimizes the network bandwidth usage by sending a very highly compressed form of the map data that contains only the essential material needed. This provides a relatively small payload from the online system and a small disk footprint when stored on the car's disk. In some cases, this is called the Level 3 Disk cache, which corresponds to the tile wire formats, 1120 and 1125. This can be kept on relatively slow and inexpensive disk.

From the Level 3 cache, the system may construct a more usable disk cache that can be loaded into memory directly and used immediately, referred to as a Level 2 cache (corresponds to the decompressed formats 1130 and 1135). This cache may contain a set of files which: (1) contain the decompressed map data, (2) contain any indexes needed by the APIs to access the data, (3) are split up into sub-tiles to allow for access of the data at a granular level that is optimized for dynamic loading as the car moves through the world, and (4) are directly loadable into memory and provide immediate access to the data. Level 2 cache files may only be created when anticipated to be used, i.e., on or along a route that is about to commence.

The memory cache can be called a Level 1 cache (corresponds to RAM, 1140 and 1145). At this level, there may be possible paths of the vehicle, and the system may maintain an active wavefront around and in front of the vehicle of the tiles and subtiles. After each localization call, the system can update the estimate of the vehicle's location. The system can then re-analyze the possible paths for the next few seconds of travel, and initiate loads of the predicted tiles and subtiles from the Level 2 cache. These loads happen asynchronously while the computations are happening, and the Level 1 cache can safely assume that the necessary data is always loaded before an access request for the data occurs. This is done by ensuring that the predicted paths are sufficiently ahead of the car and these paths are updated frequently.

FIG. 12 illustrates a flowchart 1200 of the method of efficiently utilizing compressed map tiles of the HD map from the online HD map system 110 by a vehicle computing system 120, according to an embodiment. The method begins a passenger requesting to drive a route, and with sending 1210 information describing a route to be travelled by the autonomous vehicle to the online HD map system 110. The system can ensure that the necessary tiles are loaded onto the vehicle. For example, it can inspect the Level 3 cache to identify map tiles that are already downloaded and collect the version of each. The vehicle can send a request to the online system with a list of the tiles needed as well as the versions that the vehicle already has. The method follows with receiving 1220 the plurality of compressed map tiles from the online HD map system 110. For example, the online system responds with the list of the latest tiles that are available. The system may not return tiles that are already up-to-date on the vehicle. The vehicle can make a request to download each new tile. If the disk is full, the vehicle may need to delete Level 3 tiles that are least recently used to make room. The vehicle may now ensure that all the needed tiles have been converted to Level 2 cache. If disk is full, the vehicle may delete Level 2 tiles that are least recently used to make room.

The system decompresses 1230 the plurality of compressed map tiles into accessible map tiles. The system further determines 1240 localization data describing a position of the autonomous vehicle along a first portion of the route and identifies 1250 a first accessible map tile based in part on the localization data. The in-RAM cache can be initialized, and a localization bootstrap is performed that uses synchronous loading of tiles around the car, which can take 1 second, for example. In one example, the system loads 1260 the first accessible map tile in a RAM, for utilization in driving the autonomous vehicle. The system further determines 1270 a first subset of accessible map tiles based in part on the localization data, each accessible map tile corresponding to a second portion of the route, and then loads 1280 the first subset of accessible map tiles in the RAM. Then the system may access 1290 the first accessible map tile from the RAM for use in driving the autonomous vehicle. In other words, once the location of the car is determined, the in-RAM cache can use the computed route and car's position and heading to predict the next 2 seconds worth of possible travel, and can load all of these tiles into RAM. Now the car may proceed on the route. As the car collects sensor data (e.g., at 10-20 Hz), it updates its estimate and the in-RAM cache re-computes the predicted paths and asynchronously loads those tiles while removing tiles that are no longer in the predicted car area or envelope.

Figure 13:
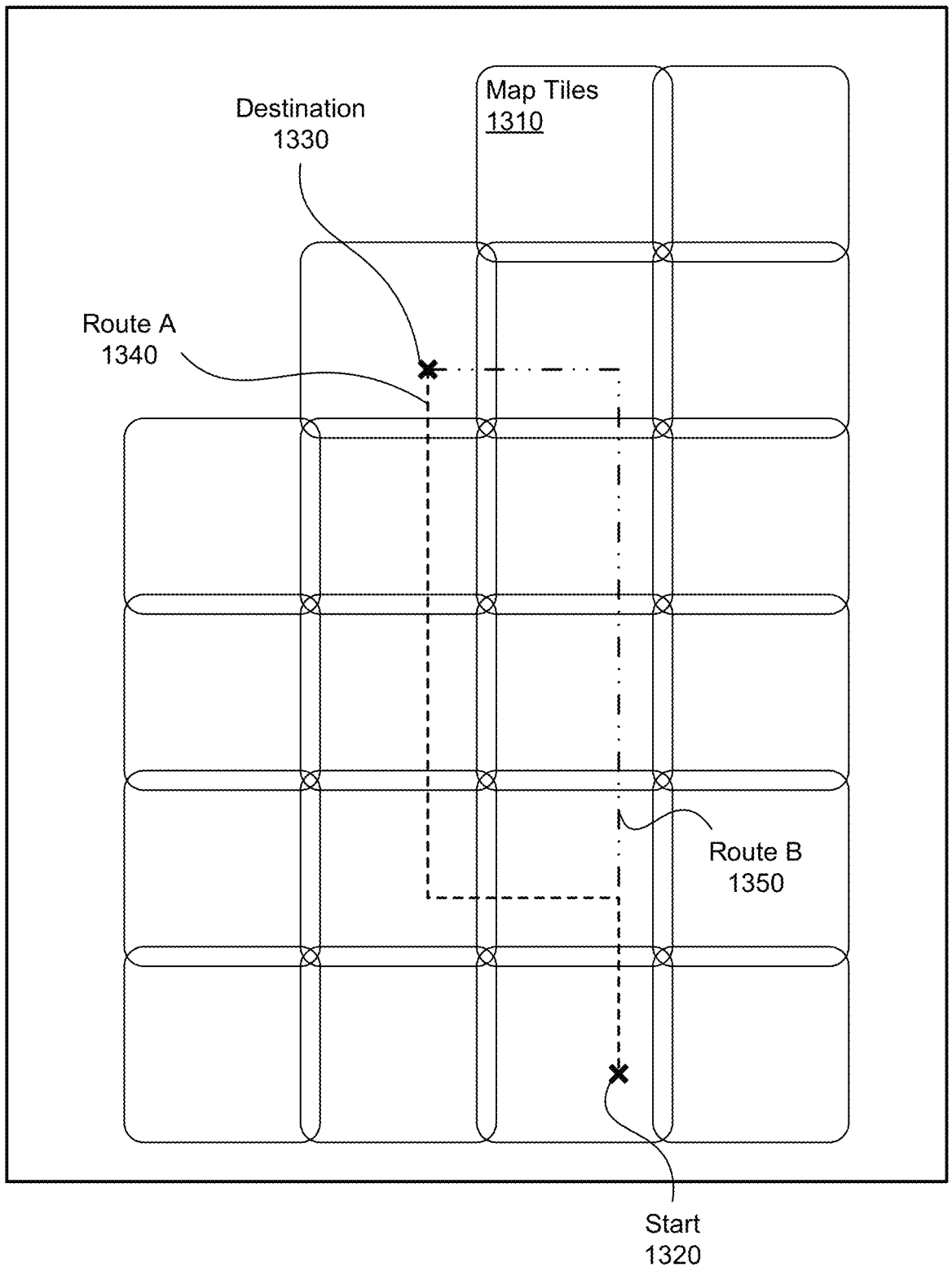
FIG. 13 illustrates an example of a process of loading accessible map tiles in a random-access memory (RAM) for use in driving the vehicle, according to an embodiment.

FIG. 13 illustrates an example of a process of loading accessible map tiles 1310 in a random-access memory (RAM) for use in driving the vehicle, according to an embodiment. The vehicle computing system 120 receives a start 1320 and a destination 1330. The vehicle computing system 120 locates geographical coordinates of the start 1320 and the destination 1330 as corresponding to map tiles of the plurality of map tiles 1310 within the HD map 1300. The vehicle computing system 120 determines one or more routes—Route A 1340 and Route B 1350—for driving the autonomous vehicle from the start 1320 to the destination 1330. As illustrated, Route A 1340 and Route B 1350 drive along the same map tile initially but diverge to drive along different map tiles to the destination 1330. As two routes are determined as potential routes for driving the autonomous vehicle, the vehicle computing system 120 decompresses all map tiles 1310 inclusive of Route A 1340 and Route B 1350. The vehicle computing system 120 additionally decompresses map tiles neighboring map tiles along Route A 1340 and Route B 1350. The vehicle computing system 120 loads the current map tile in a random-access memory (RAM) of the vehicle computing system 120. As the autonomous vehicle begins to drive along one of the routes, the vehicle computing system 120 continuously determines localization data. The vehicle computing system 120 may continuously determine which current map tile corresponds to the current location of the autonomous vehicle. Likewise, the vehicle computing system 120 loads map tiles ahead of the current location of the autonomous vehicle such that the vehicle computing system 120 can access map tiles ahead of the current location. In some instances, the map tiles ahead of the current location helps the vehicle computing system 120 update routes.

Map Tiles

The system API provides access to: (1) 3D Occupancy Map (OMap) data which is a 3D volumetric grid representation of all the roads and surroundings, (2) 3D Landmark Map (Lmap) data which is a 3D representation of lanes and line and signs that represents the 3D constraints of the road as well as semantic rules of the road. The OMap data is generally used for fast computation of the location of the car relative to the map. This can be performed using various different techniques, including for example a technique generally known as Iterative Closest Point. It takes a sensor point reading from, for example, LiDAR sensor and computes the closest point from the LiDAR point to a point on the map. It will generally do millions of these lookups per second.

To facilitate this fast lookup, the Level 2 cache representation of the OMap can be in a KDTree (other spatial indexes could be handled equivalently). The wire format OMap tiles can be roughly 500 m×500 m in area, which is much bigger than the car's nominal predicted envelope over 2 secs. Loading a KDTree with that much data is prohibitive in disk read cost and memory usage. Instead, the system can divide up the tiles into a grid of subtiles (e.g., 8×8 subtiles). These subtiles can be stored as files in the Level 2 cache and the spatial search index can be pre-computed and stored with the subtiles. Thus, the subtiles can be loaded directly into RAM and can be instantly used for spatial lookups. In addition, indexes on other attributes can be precomputed to enable different types of localization methods, for example, indexing on the color or intensity of points, or an attribute which identifies if the point is on the ground or another type of object.

To save space, the subtiles can be stored in their own coordinate system so the coordinates can be encoded in fewer bytes. This typically requires a translation of the query point and results before and after each KDTree lookup in a subtile. The API can access the OMap as if it were a single KDTree, but this may actually be a KDTree wrapping a bunch of smaller adjacent KDTrees.

The Landmark Map Data can be organized as a connected graph of Lane Elements. Lane Elements are the generic map entity that the car makes use of. Lane Elements can be accessed in 2 ways: (1) spatial lookup by LatLngAlt to find Lane Elements that overlap a specific location, and (2) lookup by identifier or ID. The spatial lookup can be managed by putting the Lane Elements into a Spatial 2D Array indexed by LatLng. For a specific LatLng, the system can get a list of Lane Elements for which there will be a more detailed geometric overlap test. The system then returns the overlapping Lane Elements. Lookup by ID may simply be a map from ID to Lane Element.

Landmark Map data is small enough that an entire LMap tile can be loaded into RAM efficiently, according to some embodiments. The LMap tiles can be kept loaded much like the OMap tiles by the in-RAM cache manager. Access can be made immediate by the API as these lookups are directly supported in RAM.

In one embodiment, the Landmark map is a connected graph of lane elements, where the graph spans the tiles. The information in the Landmark Map, (e.g., semantics, rules, and geometry) is retrievable via the lane element. This system allows the data to be loadable into RAM so that accesses to the Landmark map are essentially memory lookups. This thus turns the more conventional process involving (1) a localization result returning a Lat Lng and heading, (2) determining the spatial area of interest around the Lat Lng heading, (3) querying the database (e.g., using SQL) to retrieve map elements of a specific type, and (4) walking through a list of results to find the element(s) of interest into a process simply involving (1) a localization result providing a lane element ID (e.g., answering the query "where am I"), and (2) looking at the lane element (already in RAM) via: const LaneElement& lane_element=lane_element_array[lane_element_id] (which is implemented in an API as a function such as GetLaneElement(int id), but what it actually does is an array index of the information which is already loaded into RAM).

Computing Machine Architecture

Figure 14:
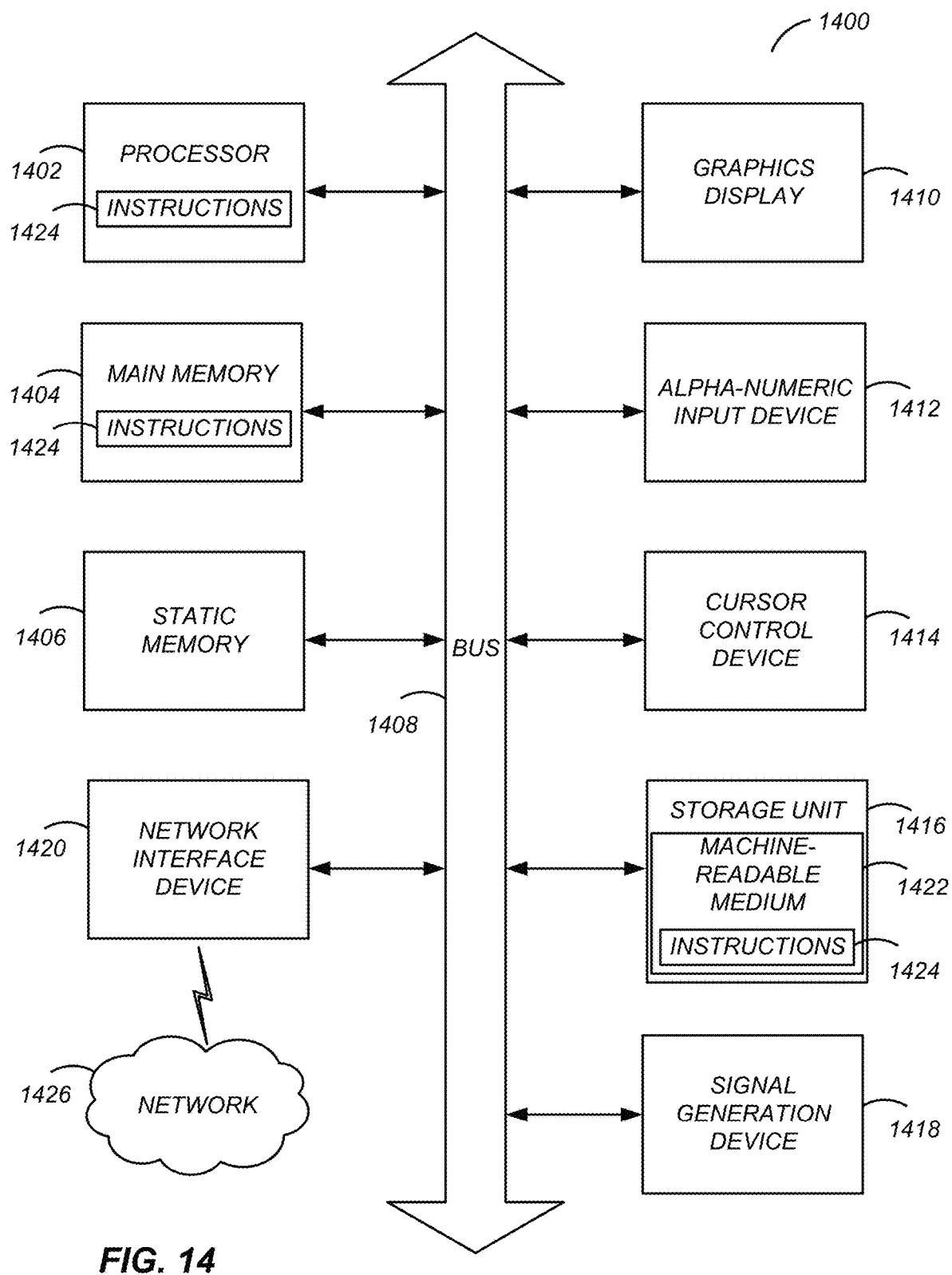
FIG. 14 illustrates an embodiment of a computing machine that can read instructions from a machine-readable medium and execute the instructions in a processor or controller.

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method of caching high-definition (HD) map data by a vehicle comprising:
   storing, by a vehicle, a plurality of map tiles, each map tile representing a portion of the HD map data;
   identifying a route to be travelled by the vehicle to reach a destination;
   receiving sensor data from one or more sensors of the vehicle;
   performing localization to determine a first location of the vehicle based on the received sensor data;
   identifying a first map tile of the HD map, the first map tile representing a geographical region including the current location of the vehicle;
   loading the first map tile in a random-access memory (RAM), wherein the RAM stores map tiles for utilization in driving the vehicle along the route;
   predicting movement of the vehicle within a threshold time interval from the first location;
   determining a first subset of map tiles based on a combination of the first location and the predicted movement, each map tile of the first subset of map tiles corresponding to a portion of a route that the vehicle is likely to drive through within the threshold time interval;
   loading the first subset of map tiles in the RAM; and
   navigating the vehicle along the route by accessing the first subset of map tiles loaded in the RAM.

2. The method of claim 1, further comprising:
   receiving the plurality of map tiles from an online system.

3. The method of claim 1, wherein the sensors comprise a detection and ranging sensor mounted on the vehicle, and wherein the sensor data collected by the detection and ranging sensor comprises a depth map of an environment surrounding the vehicle.

4. The method of claim 1, wherein the sensors comprise a Global Positioning System (GPS) receiver, and wherein the sensor data collected by the GPS receiver comprises geolocation coordinates of the vehicle.

5. The method of claim 1, wherein the sensors comprise a camera, and wherein the sensor data collected by the camera comprises images of an environment surrounding the vehicle.

6. The method of claim 1, wherein the sensors comprise an inertial measurement unit (IMU), and wherein the sensor data collected by the IMU comprises motion data of the vehicle.

7. The method of claim 1, wherein performing localization further determines a velocity of the vehicle, and wherein the predicted movement is based on the velocity of the vehicle.

8. The method of claim 1, wherein determining the first subset of map tiles based on the combination of the first location and the predicted movement further comprises:
   identifying a first map tile in which the vehicle is currently located based on the first location of the vehicle; and
   determining one or more other map tiles adjacent to the first map tile based on the predicted movement, wherein the first subset of map tiles is inclusive of the first map tile and the other map tiles.

9. The method of claim 8, wherein determining the first subset of map tiles based on the combination of the first location and the predicted movement further comprises:

identifying a lane within the first map tile, wherein determining the other map tiles adjacent to the first map tile is further based the identified lane.

10. The method of claim 1, further comprising:
performing localization to determine a second location of the vehicle at a second time based on the received sensor data;
predicting subsequent movement of the vehicle within the threshold time interval from the second location;
determining a second subset of map tiles based on a combination of the second location and the predicted subsequent movement, each map tile of the second subset of map tiles corresponding to a subsequent portion of the route that the vehicle is likely to drive through within the threshold time interval;
loading the second subset of map tiles in the RAM; and
navigating the vehicle along the route by accessing the second subset of map tiles loaded in the RAM.

11. A non-transitory computer-readable storage medium with encoded instructions that, when executed by a processor, cause the processor to perform steps of:
storing, by a vehicle, a plurality of map tiles, each map tile representing a portion of the HD map data;
identifying a route to be travelled by the vehicle to reach a destination;
receiving sensor data from one or more sensors of the vehicle;
performing localization to determine a first location of the vehicle based on the received sensor data;
identifying a first map tile of the HD map, the first map tile representing a geographical region including the current location of the vehicle;
loading the first map tile in a random-access memory (RAM), wherein the RAM stores map tiles for utilization in driving the vehicle along the route;
predicting movement of the vehicle within a threshold time interval from the first location;
determining a first subset of map tiles based on a combination of the first location and the predicted movement, each map tile of the first subset of map tiles corresponding to a portion of a route that the vehicle is likely to drive through within the threshold time interval;
loading the first subset of map tiles in the RAM; and
navigating the vehicle along the route by accessing the first subset of map tiles loaded in the RAM.

12. The storage medium of claim 11, the steps further comprising:
receiving the plurality of map tiles from an online system.

13. The storage medium of claim 11, wherein the sensors comprise a detection and ranging sensor mounted on the vehicle, and wherein the sensor data collected by the detection and ranging sensor comprises a depth map of an environment surrounding the vehicle.

14. The storage medium of claim 11, wherein the sensors comprise a Global Positioning System (GPS) receiver, and wherein the sensor data collected by the GPS receiver comprises geolocation coordinates of the vehicle.

15. The storage medium of claim 11, wherein the sensors comprise a camera, and wherein the sensor data collected by the camera comprises images of an environment surrounding the vehicle.

16. The storage medium of claim 11, wherein the sensors comprise an inertial measurement unit (IMU), and wherein the sensor data collected by the IMU comprises motion data of the vehicle.

17. The storage medium of claim 11, wherein performing localization further determines a velocity of the vehicle, and wherein the predicted movement is based on the velocity of the vehicle.

18. The storage medium of claim 11, wherein determining the first subset of map tiles based on the combination of the first location and the predicted movement further comprises:
identifying a first map tile in which the vehicle is currently located based on the first location of the vehicle; and
determining one or more other map tiles adjacent to the first map tile based on the predicted movement, wherein the first subset of map tiles is inclusive of the first map tile and the other map tiles.

19. The storage medium of claim 18, wherein determining the first subset of map tiles based on the combination of the first location and the predicted movement further comprises:
identifying a lane within the first map tile, wherein determining the other map tiles adjacent to the first map tile is further based the identified lane.

20. The storage medium of claim 11, the steps further comprising:
performing localization to determine a second location of the vehicle at a second time based on the received sensor data;
predicting subsequent movement of the vehicle within the threshold time interval from the second location;
determining a second subset of map tiles based on a combination of the second location and the predicted subsequent movement, each map tile of the second subset of map tiles corresponding to a subsequent portion of the route that the vehicle is likely to drive through within the threshold time interval;
loading the second subset of map tiles in the RAM; and
navigating the vehicle along the route by accessing the second subset of map tiles loaded in the RAM.

21. A system on a vehicle comprising:
a processor; and
a computer-readable storage medium with encoded instructions that, when executed by the processor, cause the processor to perform steps of:
storing a plurality of map tiles, each map tile representing a portion of the HD map data;
identifying a route to be travelled by the vehicle to reach a destination;
receiving sensor data from one or more sensors of the vehicle;
performing localization to determine a first location of the vehicle based on the received sensor data;
identifying a first map tile of the HD map, the first map tile representing a geographical region including the current location of the vehicle;
loading the first map tile in a random-access memory (RAM), wherein the RAM stores map tiles for utilization in driving the vehicle along the route;
predicting movement of the vehicle within a threshold time interval from the first location;
determining a first subset of map tiles based on a combination of the first location and the predicted movement, each map tile of the first subset of map tiles corresponding to a portion of a route that the vehicle is likely to drive through within the threshold time interval;
loading the first subset of map tiles in the RAM; and
navigating the vehicle along the route by accessing the first subset of map tiles loaded in the RAM.

22. The system of claim 21, the steps further comprising:
receiving the plurality of map tiles from an online system.

23. The system of claim 21, wherein performing localization further determines a velocity of the vehicle, and wherein the predicted movement is based on the velocity of the vehicle.

24. The storage medium of claim 21, wherein determining the first subset of map tiles based on the combination of the first location and the predicted movement further comprises:
   identifying a first map tile in which the vehicle is currently located based on the first location of the vehicle; and
   determining one or more other map tiles adjacent to the first map tile based on the predicted movement, wherein the first subset of map tiles is inclusive of the first map tile and the other map tiles.

25. The storage medium of claim 21, the steps further comprising:
   performing localization to determine a second location of the vehicle at a second time based on the received sensor data;
   predicting subsequent movement of the vehicle within the threshold time interval from the second location;
   determining a second subset of map tiles based on a combination of the second location and the predicted subsequent movement, each map tile of the second subset of map tiles corresponding to a subsequent portion of the route that the vehicle is likely to drive through within the threshold time interval;
   loading the second subset of map tiles in the RAM; and
   navigating the vehicle along the route by accessing the second subset of map tiles loaded in the RAM.

\* \* \* \* \*